3,195,958
TRANSPORT OF FINE SOLIDS
Robert R. Goins, Bartlesville, Okla., assignor to Phillips Petroleum Company, a corporation of Delaware
Filed Sept. 28, 1962, Ser. No. 226,869
10 Claims. (Cl. 302—17)

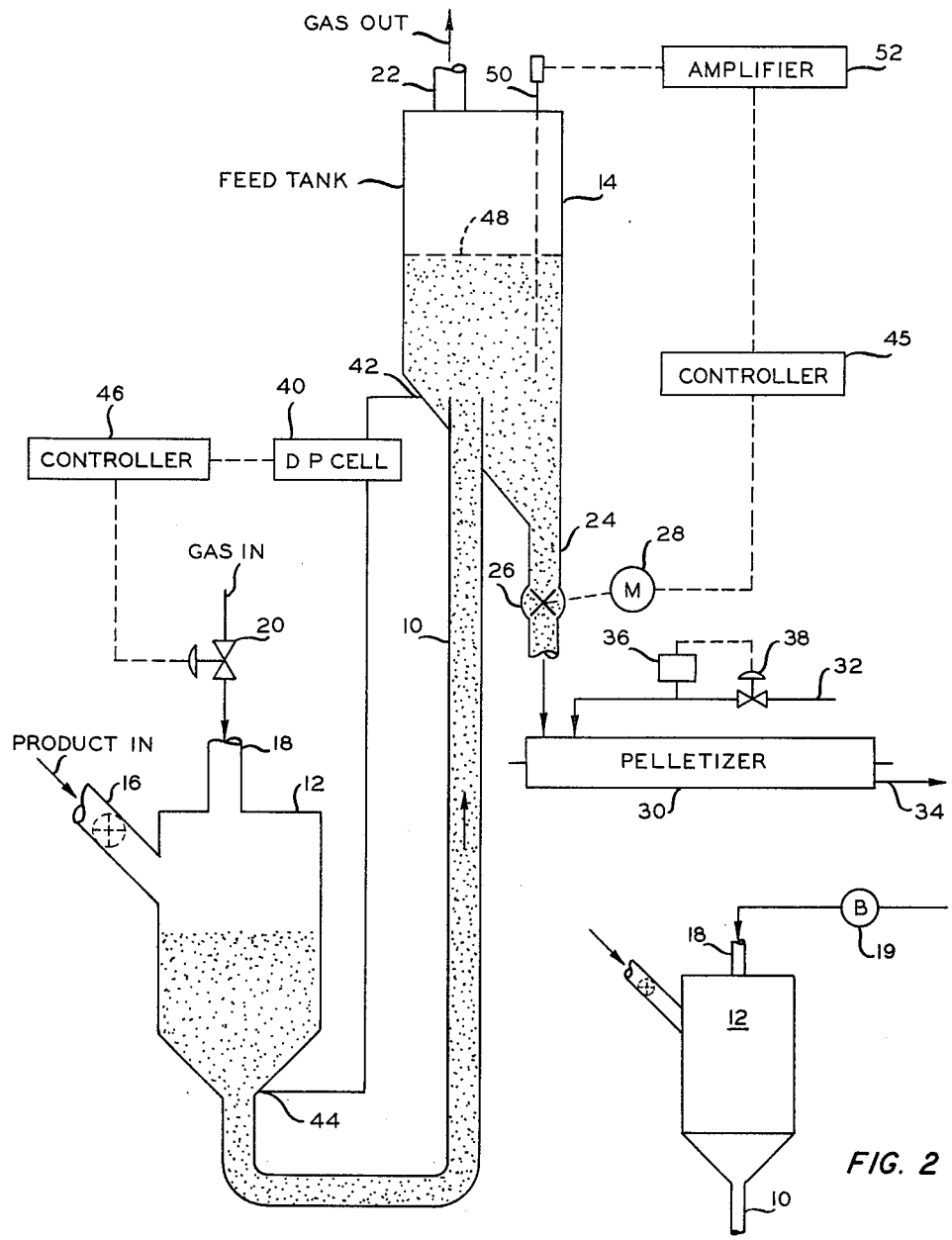

This invention relates to a process and apparatus for feeding fine solids of varying density at a substantially constant weight rate to a process requiring feed regulation. A specific aspect of the invention relates to the feeding of flocculent carbon black to a pelletizer.

Some solids in finely divided form are difficult to feed at a constant weight rate, yet some processes require or are greatly enhanced by feeding one of the materials in the form of fine solid to a process at a relatively constant weight rate. Flocculent carbon black is a good illustration of a finely divided material which is difficult to feed. This material varies in weight from about 4 to about 6.5 pounds per cubic foot as it exists in a carbon black plant just before pelleting. Hence an application in point is the feeding of flocculent carbon black to a wet pelletizer where the black is mixed with a fixed proportion by weight of water. Heretofore, feeding of black has been rather erratic and it has been necessary to vary the flow rate of water drastically in order to even approximate the desired ratio of water to black. In this type of operation the difficulty is in sensing the variations in weight rate of feeding black to the pelletizer.

This invention is concerned with a method of transporting finely divided solids at a constant weight rate and to an improved process for feeding carbon black to a wet pelletizer.

Accordingly, it is an object of the invention to provide a method and apparatus for feeding finely divided solids of varying density at a constant weight rate to a process requiring the same. Another object is to provide a method and apparatus for feeding flocculent carbon black to a wet pelletizer. Other objects of the invention will become apparent to one skilled in the art upon consideration of the accompanying disclosure.

A recent development in solids conveyance involves the movement of solids through conduits while the solids are maintained in a dense or compact condition, a condition in which their bulk density while in motion is substantially the same as the bulk density of the solids when at rest. The movement of the solids is produced by means of a concurrent flow of fluid through a mass of the solids introduced at the inlet end of a lift or conveyance conduit under relatively high pressure, the pressure depending upon the head provided by the lift conduit, and discharged at the outlet with the solids at a relatively low pressure. The applied pressure differential between the inlet and the outlet of the conveyance conduit is such that the fluid flows through the interstices of the solid mass at a rate sufficient to generate a pressure gradient throughout the mass which in turn is sufficient to overcome forces of friction and gravity opposing the movement of the solids. This maintains a net conveying force in the desired flow direction which is effective at every point throughout the entire solids mass so that a small over-all pressure differential moves the solids through the conveyance conduit.

The present invention is an improvement and development in this dense, compact flow type of conveyance and conveying equipment. A broad aspect of this invention comprises contacting a mass of fine solids with a transport gas in a lower chamber connected with an upper feed chamber by an elongated conveyance conduit so as to form a dense or compact phase of the solids in the gas extending to an intermediate level in the feed chamber, maintaining a substantially constant differential pressure between a selected lower level in the solids being transported (such as adjacent the lower end of the lift tube) and a selected upper level (such as adjacent the upper end of the lift tube) whereby the upper level of the dense phase in the feed chamber rises above said intermediate level as the density of the solid phase decreases and vice versa, and withdrawing solids from a lower section of the upper chamber at a varied volume rate which is dependent upon the bulk density of the solids. A similar result can be obtained by feeding a constant weight flow rate of gas thru the solids lift conduit as the conveyance gas and controlling the withdrawal rate in the same manner.

The process depends upon the fact that with a given pressure differential or a constant weight flow rate of gas, the level of the compact column of solids in the feed chamber varies with the bulk density of the fine solids, i.e., as the bulk density of the solids increases, the level of solids recedes and as the bulk density of the solids decreases the level rises. In order to feed the solids at a constant weight rate, the volume rate of feeding the solids is increased as the level of solids rises and as the level recedes the volume rate of feeding is decreased.

Apparatuswise, the invention comprises in combination with conventional solids conveyance equipment including a lift conduit and an upper feed chamber, means for sensing the level of solids in the upper chamber and emitting a signal proportional to the solids level, a feeder valve in the outlet from the upper chamber, a variable speed drive on the feeder, and a controller sensitive to the emitted signal which is in control of the variable speed drive. In one embodiment, a differential pressure-maintaining device is applied to the apparatus to maintain a relatively constant differential pressure between the selected upper level and the selected level substantially lower in the solids system. In another embodiment, a constant weight flow rate device is applied to the gas injection means adjacent the intake of the lift conduit.

A more complete understanding of the invention may be had by reference to the accompanying schematic drawing of which FIGURE 1 is an elevational view of a preferred arrangement of apparatus for effecting the process of the invention, and FIGURE 2 is a similar view showing another embodiment of the invention.

Referring to FIGURE 1 of the drawing, a lift or transport conduit 10 connects a lower supply chamber 12 with an upper feeder chamber 14. Solids, such as carbon black from a suitable source, are fed into chamber 12 through a line 16 containing an air lock valve, not shown. Lift gas is fed into chamber 12 through line 18 containing a motor valve 20. Feeder chamber 14 is provided with gas outlet line 22 in its top (which may contain a gas-solids separator) and a solids outlet line 24 in its bottom. Rotary air lock valve feeder 26 is positioned in line 24 and is driven by variable speed motor 28. Line 24 connects with the feed end of a conventional wet pelletizer 30 which is provided with a water feed line 32 and a pellet take-off line 34. A constant flow rate of water is maintained by flow rate controller 36 and motor valve 38. A selected differential pressure which maintains a suitable intermediate level of solids in chamber 14 is maintained by differential pressure cell 40 which is connected to a pressure tap 42 in chamber 14 and a similar pressure tap 44 in chamber 12. Differential pressure cell 40 feeds a signal (proportional to the differential pressure sensed) to controller 46 which is in control of motor valve 20 in line 18. Taps may be made in chambers 12 and 14 at other locations than those shown, it being essential that a substantial difference in level between the upper level and the lower level be taken. Controller 46 is set to hold motor valve 20 in such a position that the top level of solids in chamber 14 is maintained substantially above the upper end of conduit 10 and below the top of the feed chamber under all conditions of density. A suitable level of solids for the intermediate density is indicated at line 48.

The rate of feeding solids from feed chamber 14 is controlled by the speed of motor 28 which operates valve or feeder 26. In order to control the speed of motor 28 and therefore the volume rate of feed take-off through feeder 26, a level-sensing device exemplified by and comprising a probe 50, an amplifier 52, and a controller 45, senses the level of solids in chamber 14 and controls the speed of motor 28 so as to increase same as the solids level rises above line 48 and decreases same as the level of solids recedes from line 48. The probe, amplifier, and controller are commercially available instruments designed to sense the level of powdered solids in a tank. Controller 45 is available in a form which puts out either an electrical signal or an air signal, either of which may be utilized to control the speed of motor 28. Instruments, Inc., of Tulsa, Oklahoma, supplies such equipment under the trade name "electr-o-level."

Other level-sensing devices may also be utilized in lieu of that shown in the drawing. The level may be sensed electrically by means of an electric eye arrangement or the level may be sensed by sonic or supersonic means commercially available.

In FIGURE 2, a constant weight rate blower 19 is utilized in lieu of a pressure differential controller arrangement to feed gas into chamber 12 and thru conveyance conduit 10 at a substantially constant weight rate.

In operation with a feed or given bulk density, controller 46 is set to establish a suitable intermediate level 48 in chamber 14. As the feed bulk density changes, level 48 rises with a decrease in feed density and recedes upon an increase in feed density. In either instance, the level is sensed by probe 50 and the speed of motor 28 is varied through amplifier 52 and controller 45 so as to increase the volume rate of feeding by feeder 26 upon a rise in level 48 and decrease the speed of this valve when the level recedes from level 48.

The level in the feed chamber, for a given $\Delta P$, is dependent upon the bulk density of the solids being fed. This level determines the speed of the rotary feeder which is calibrated to deliver a constant weight regardless of bulk density of the solids. In a similar manner, the level of solids changes with the bulk density when utilizing a constant weight rate of gas into the system and the volume rate of feeding is varied in response to the solids level to feed solids at a constant weight rate thru feeder 26. In this manner, a substantially constant weight rate of feeding or conveying solids is maintained by the system.

With a constant feed rate of carbon black to pelletizer 30, the volume of water fed to the pelletizer per unit of time is maintained relatively constant so as to maintain a suitable ratio of black and water in the pelletizer. This proportion of water to black is about 42 to 58 weight percent of water in the mixture. Usually, around 50 percent water and 50 percent black form good pellets.

The apparatus and process of the invention are applicable to the feeding of other particulate solids at a relatively constant weight rate. One application is in the feeding of powdered catalytic materials to a pelletizer.

Certain modifications of the invention will become apparent to those skilled in the art and illustrative details disclosed are not to be construed as imposing unnecessary limitations on the invention.

I claim:

1. A process for the feeding of particulate solids of changing bulk density at a constant weight flow rate which comprises contacting a mass of said solids with a transport gas in a lower chamber connected with an upper feed chamber by an elongated transport conduit so as to form a dense phase of solids in said gas extending to a selected intermediate level in said feed chamber above the upper end of said conduit; maintaining a substantially constant pressure differential between a selected lower level in the solids being transported and said intermediate level so that the upper level of said dense phase in said feed chamber rises above said intermediate level as the bulk density of said solid phase decreases and vice versa; sensing the level of said dense phase; and withdrawing solids from a lower section of said feed chamber at a variable volume rate which maintains the dense phase level adjacent said intermediate level by increasing the withdrawal rate when said dense phase level rises above said intermediate level in proportion to the rise, and decreasing the withdrawal rate when said level recedes from said intermediate level in proportion to the amount of recession.

2. The process of claim 1 wherein said solids are carbon black.

3. A process for the feeding of particulate solids of changing bulk density at a constant weight flow rate which comprises contacting a mass of said solids with a transport gas in a lower chamber connected with an upper feed chamber by an elongated transport conduit so as to form a dense phase of solids in said gas extending to a selected intermediate level in said feed chamber above the upper end of said conduit; controlling the flow of gas thru said transport conduit so that said level rises as the bulk density of said solids decreases and recedes as said bulk density increases; withdrawing solids from a lower section of said upper chamber and gas from an upper section thereof; and increasing the volume rate of withdrawing solids as said intermediate level rises and decreasing the volume rate of withdrawing solids as said level recedes so as to withdraw solids at a constant weight rate.

4. The process of claim 3 wherein said flow of gas is controlled by maintaining a substantially constant weight flow rate thereof.

5. The process of claim 3 wherein said flow of gas is controlled by maintaining a substantially constant differential gas pressure between two spaced apart selected levels in the dense solid phase.

6. Apparatus for conveying particulate solids comprising in combination an upper feed chamber and a lower engaging chamber connected by an upright lift conduit extending into said feed chamber to a lower level therein; a solids inlet and a gas inlet in said lower chamber; a gas outlet in the upper section of said feed chamber and a solids outlet in the lower section thereof, the upper end of said conduit being intermediate said gas and solids outlets and substantially below said gas outlet; a delivery conduit connected with said solids outlet having a rotary feeder therein; a variable speed drive on said feeder; means for passing gas thru the system from said lower chamber, to said lift conduit, and into and thru said feed chamber so as to maintain a level of solids in said feed chamber which rises as the bulk density of solids decreases and recedes as the bulk density thereof increases; means for sensing the level of solids in said feed chamber and increasing the speed of said variable speed drive when the level of solids rises above said level and decreasing said speed when the level of solids falls below said level.

7. The apparatus of claim 6 wherein last said means comprises a capacitance probe positioned upright in said feed chamber and said variable-speed drive comprises a variable speed electric motor.

8. The apparatus of claim 6 wherein last said means comprises a capacitance probe positioned upright in said feed chamber; an amplifier operatively connected with said probe; a controller sensitive to said amplifier and operatively connected to said variable speed drive.

9. The apparatus of claim 6 wherein means for passing gas thru said system comprises a gas supply connected with said gas inlet; a motor valve in said gas supply line; pressure sensing means at widely spaced levels in the gas stream in said system; a differential pressure cell sensitive to said pressure sensing means; and a controller sensitive to said cell and in control of said motor valve.

10. The apparatus of claim 6 wherein said means for passing gas thru the system comprises a gas supply line connected with said gas inlet; and means in said supply line for feeding gas into said system at a constant weight rate.

References Cited by the Examiner
UNITED STATES PATENTS

| | | | |
|---|---|---|---|
| 2,668,365 | 2/54 | Hogin | 302—35 |
| 2,739,845 | 3/56 | Berg | 302—53 X |
| 2,860,174 | 11/58 | Begley et al. | 302—35 |
| 2,898,158 | 8/59 | Pollock | 302—53 |
| 2,905,538 | 9/59 | McIntire | 302—53 |
| 2,949,349 | 8/60 | King | 18—1 X |
| 3,056,162 | 10/62 | Fisher | 23—314 X |

ALEXANDER H. BRODMERKEL, *Primary Examiner.*

ALFRED L. LEAVITT, *Examiner.*